US 12,054,267 B2

(12) United States Patent
Biaujaud et al.

(10) Patent No.: US 12,054,267 B2
(45) Date of Patent: Aug. 6, 2024

(54) HYBRID PROPULSION ARCHITECTURE AND AIRCRAFT CONTAINING SUCH AN ARCHITECTURE

(71) Applicant: SAFRAN, Paris (FR)

(72) Inventors: Remy Biaujaud, Moissy-Cramayel (FR); Rene Meunier, Moissy-Cramayel (FR); Jerome Didier Mora, Moissy-Cramayel (FR); Florent Rougier, Moissy-Cramayel (FR); Jerome Valire, Moissy-Cramayel (FR)

(73) Assignee: SAFRAN, Paris (FR)

( * ) Notice: Subject to any disclaimer, the term of this patent is extended or adjusted under 35 U.S.C. 154(b) by 61 days.

(21) Appl. No.: 17/754,980

(22) PCT Filed: Nov. 5, 2020

(86) PCT No.: PCT/FR2020/052005
§ 371 (c)(1),
(2) Date: Apr. 18, 2022

(87) PCT Pub. No.: WO2021/089948
PCT Pub. Date: May 14, 2021

(65) Prior Publication Data
US 2022/0355944 A1 Nov. 10, 2022

(30) Foreign Application Priority Data
Nov. 5, 2019 (FR) ...................................... 1912405

(51) Int. Cl.
*B64D 27/24* (2024.01)
*B64C 29/00* (2006.01)
(Continued)

(52) U.S. Cl.
CPC .......... *B64D 27/24* (2013.01); *B64C 29/0008* (2013.01); *B64D 27/026* (2024.01); *H02J 1/10* (2013.01)

(58) Field of Classification Search
CPC .............. B64D 27/24; B64D 2027/026; B64C 29/0008; H02J 1/10
See application file for complete search history.

(56) References Cited

U.S. PATENT DOCUMENTS

| | | | |
|---|---|---|---|
| 2009/0079261 A1* | 3/2009 | Rozman | H02P 9/307 307/9.1 |
| 2016/0016670 A1* | 1/2016 | Sautreuil | B64D 27/10 903/904 |
| 2021/0139154 A1* | 5/2021 | Klonowski | B64D 27/24 |

FOREIGN PATENT DOCUMENTS

| | | |
|---|---|---|
| EP | 2040370 A2 | 3/2009 |
| FR | 3079210 A1 | 9/2019 |

OTHER PUBLICATIONS

International Search Report received for PCT Patent Application No. PCT/FR2020/052005, mailed on Jan. 28, 2021, 5 pages (2 pages of English Translation and 3 pages of Original Document).

* cited by examiner

*Primary Examiner* — Tye William Abell
(74) *Attorney, Agent, or Firm* — WOMBLE BOND DICKINSON (US) LLP

(57) ABSTRACT

The invention relates to a hybrid propulsion architecture (100) for an aircraft, comprising: —a first source (102) of a first energy type, —second sources (104) of a second energy type different from the first energy type, —electrical propulsion systems (106), —an electric power supply network (118) connecting the first and second sources (102, 104) to the electrical propulsion systems, such that each electrical propulsion system is powered by the first source and by one (Continued)

of the second sources, the architecture being characterised in that it further comprises: —means for segregating (120) the electrical propulsion systems, which means are arranged in the electric power supply network and configured to impose a direction of flow of the electric power from the first source to the electrical propulsion systems.

10 Claims, 6 Drawing Sheets

(51) Int. Cl.
*B64D 27/02* (2006.01)
*H02J 1/10* (2006.01)

HYBRID PROPULSION ARCHITECTURE AND AIRCRAFT CONTAINING SUCH AN ARCHITECTURE

TECHNICAL FIELD

The invention concerns a hybrid propulsion architecture and a multi-rotor vertical take-off and landing (VTOL) aircraft, such as a dual-rotor counter-rotating quadricopter, comprising such a hybrid propulsion architecture.

PRIOR ART

The prior art comprises, in particular, the documents FR-A1-3 079 210, EP-A2-2 040 370 and US-A1-2016/016670. The document FR-A1-3 079 210 describes a hybrid propulsion architecture that comprises a first source of a first type of energy, second sources of a second type of energy, electrical propulsion systems and an electrical energy supply network that connects the assembly.

In a known way, a hybrid propulsion architecture is an architecture which uses several energy sources of different type, for example electric-thermal and electrochemical, to feed propulsion systems, and therefore which uses several energy sources of different type for each propulsion channel.

A hybrid propulsion architecture is known, in which there are as many energy sources of each type as there are propulsion channels.

As shown in FIG. 1, the architecture 10 comprises a plurality of propulsion channels 18, of which three are shown, each propulsion channel 18 comprising a first source 12 of a first type of energy, a second source 14 of a second type of energy, different from the first type of energy, and one or a plurality of charges 16. The first and second sources 12, 14 are separate between each propulsion channel 18. In this architecture 10, there are therefore as many first sources 12, as second sources 14, as there are propulsion channels 18.

However, this architecture is costly, since it integrates a large number of sources.

In order to reduce the cost and mass of the architecture, it has been proposed to reduce the number of sources, for example by integrating only one source of a first type of energy into the architecture.

As shown in FIG. 2, the architecture 20 comprises a single first source 22 of a first type of energy. Each propulsion channel 28 comprises the first source 22, a second source 24 of a second type of energy, different from the first type of energy, and one or a plurality of charges 26. The second sources 24 are distinct between the different propulsion channels 28, while the first source 22 is common to all the propulsion channels 28. Thus, in this architecture 20, there are as many second sources 24, as there are propulsion channels 28, but only one first source 22 that feeds all the propulsion channels 28.

However, in such an architecture, there is a common point P between the different propulsion channels, which can propagate a fault from one propulsion channel to another propulsion channel, and thus generate the loss of several propulsion channels following a single failure. For example, a short circuit on one of the charges can propagate to the other charges in the architecture.

In order to solve this problem, it was proposed to integrate the common point between the different propulsion channels to the first source of the first type of energy. Thus, the first source does not propagate a fault from one propulsion channel to another propulsion channel.

As shown in FIG. 3, the architecture 30 comprises a single first source 32 of a first type of energy, which incorporates the common point between the different propulsion channels 38. Each propulsion channel 38 comprises the first source 32, a second source 34 of a second type of energy, different from the first type of energy, and one or a plurality of charges 36. The second sources 34 are distinct between the different propulsion channels 38, while the first source 32 is common to all the propulsion channels 38. Thus, in this architecture 30, there are as many second sources 34, as there are propulsion channels 38, but only one first source 32 that feeds all propulsion channels 38.

However, in this architecture, the design of the first source is constrained, both in terms of cost and complexity.

In addition, the technological solutions allowing to realise a decoupling of the propulsion channels within the first source are currently poorly mastered, and some modes of malfunction are not resolved. For example, one solution currently proposed is to use a permanent magnet alternator with three isolated outputs, thus allowing three propulsion channels to be powered. However, the design of such an alternator does not allow for independence of the outputs, especially in the event of a fault. Thus, a short circuit on one propulsion channel can propagate to the other propulsion channels.

In addition, this architecture lacks flexibility in the power distribution. Although the alternator is rated for a power of 300 kW, each output is rated for a power of 100 kW. Thus, the electrical system is unable to provide more than 100 kW of power to a propulsion channel, even if the total consumption of the electrical system is less than 300 kW.

To overcome this drawback, it would be necessary to oversize the alternator. For example, in order to provide a power of 150 kW on two of the three outputs, and a zero power of 0 kW on the last output (reconfiguration of the electrical system, following a fault for example), i.e., a total power of 300 kW, it is necessary to size the alternator for a total power of 450 kW, which has an impact on its mass of about 50%.

The purpose of the invention is to provide a solution to remedy at least some of these drawbacks.

SUMMARY OF THE INVENTION

It is an objective of the invention to be able to reduce the number of sources of the hybrid propulsion architecture, by creating common points through which electrical energy can flow from a single first source of a first type of energy towards different charges, while ensuring non-propagation of defects on the charges through these common points.

To this end, the invention relates to a hybrid propulsion architecture for an aircraft, comprising:
  a first source, of a first type, of electrical energy,
  a plurality of second sources, of a second type, of electrical energy, said second type being different from said first type,
  a plurality of electrical propulsion systems,
  an electrical energy supply network connecting said first source and said second sources to said electrical propulsion systems such that each electrical propulsion system is powered by said first source and by one of said second sources,
  propulsion channels, each propulsion channel comprising said first source, one of said second sources, one of said electrical propulsion systems, and a portion of the electrical energy supply network, said architecture being characterised in that it further comprises:

means for segregating said electrical propulsion systems, said segregation means being arranged on said electrical energy supply network and configured to impose a direction of flow of electric power from said first source to said electrical propulsion systems so that said propulsion channels are segregated.

The architecture according to the invention allows the number of energy sources to be reduced, thus reducing the costs and the total mass of the architecture.

In addition, the first energy source is simplified compared to the prior art, and the number of its components is reduced, which increases the reliability of the architecture and reduces its costs.

A propulsion channel comprises the first source, a second source, an electrical propulsion system (also known as a charge) and a portion of the electrical energy supply network between these different elements of the architecture.

The segregation means allow the segregation of the propulsion channels. Thus, the architecture according to the invention is advantageously tolerant to a single failure.

According to the invention, the flux of electrical energy are forced to be unidirectional in the propulsion channels, so as to avoid the propagation of failures between the different propulsion channels. The electrical energy is forced to transit from the common point towards the charges, but cannot transit from the charges to the common point.

According to one embodiment, the first energy source may be an electrical-thermal generation source, and the second energy sources may be electrochemical storage sources.

The architecture according to the invention thus allows a plurality of propulsion channels to be powered, from a plurality of electrochemical storage sources and a single electrical-thermal generation source providing only a single power channel.

The architecture according to the invention allows the plurality of propulsion channels to be powered simultaneously, ensuring that no single failure can generate the loss of more than one propulsion channel.

The architecture according to the invention also allows an automatic distribution of the electric power of the electrical-thermal generation source, without a communication channel connecting the different propulsion channels and the electrical-thermal generation source.

The electrical energy supply network may be a High Voltage Direct Current (HVDC) network. In this case, the segregation means may comprise diodes.

The architecture according to the invention may comprise power electronic converters connected to the electrical energy supply network. Advantageously, the power electronic converters allow to improve the control of the electric power distribution in the different propulsion channels.

According to one embodiment, the power electronic converters are connected between the second sources and the electrical propulsion systems.

According to another embodiment, the power electronic converters are connected between the segregation means and the electrical propulsion systems.

The architecture according to the invention may comprise second means for segregating the electrical propulsion systems arranged on the electrical energy supply network and configured to impose a direction of flow of electric power from the second sources to the electrical propulsion systems. The second segregation means may comprise diodes.

According to one embodiment, the power electronic converters are connected between the second sources and the electrical propulsion systems, in parallel to the second segregation means.

Preferably, the first and second sources are segregated from each other. In other words, there is no communication between the different energy sources. More specifically, the first source may be segregated from each second source and each second source may be segregated from the first source and the other second sources.

According to one embodiment, the first source comprises a variable frequency generator (VFG). In this case, the architecture further comprises a passive rectifier connected to the first source. The rectifier may be an AC-DC (Alternative Current-Direct Current) converter.

According to one embodiment, the first source is a battery and the second sources are permanent magnet generators (PMGs).

A battery is an electrochemical source. For example, the first source can be a lithium-ion battery.

A permanent magnet machine is an electromechanical source.

The invention also relates to a multi-rotor aircraft, in particular with vertical take-off and landing, characterised in that it comprises a hybrid propulsion architecture according to the invention.

According to one embodiment, the aircraft is a dual-rotor counter-rotating quadricopter VTOL.

Advantageously, the aircraft according to the invention is tolerant to a single failure. More specifically, no malfunction results in the loss of more than one pair of rotors, i.e. two diametrically opposed rotors.

BRIEF DESCRIPTION OF THE DRAWINGS

The present invention will be better understood and further details, features and advantages of the present invention will become clearer from the following description of a non-limiting example, with reference to the attached drawings in which.

Figure 1:
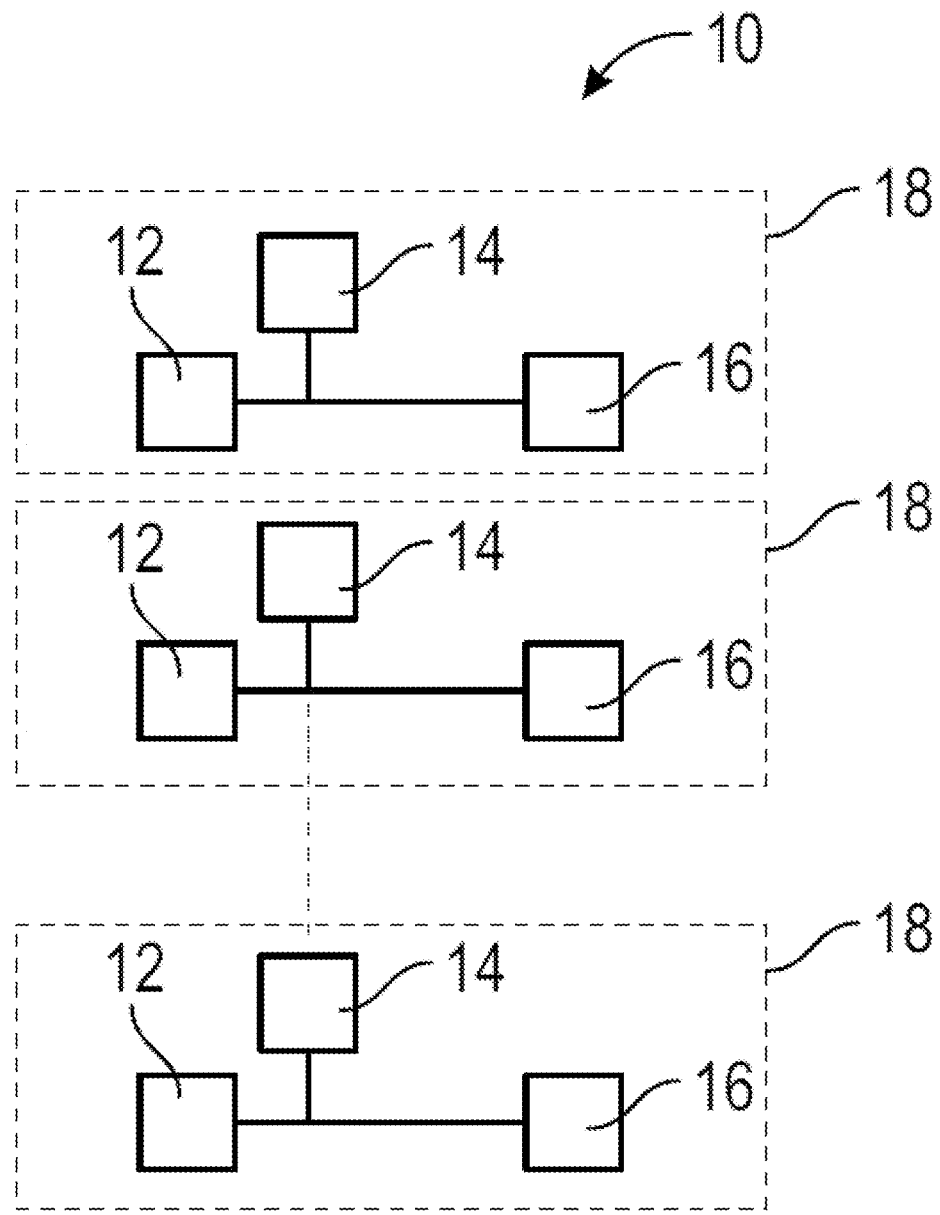
FIG. 1 represents a hybrid propulsion architecture according to a first embodiment of the prior art.
Figure 2:
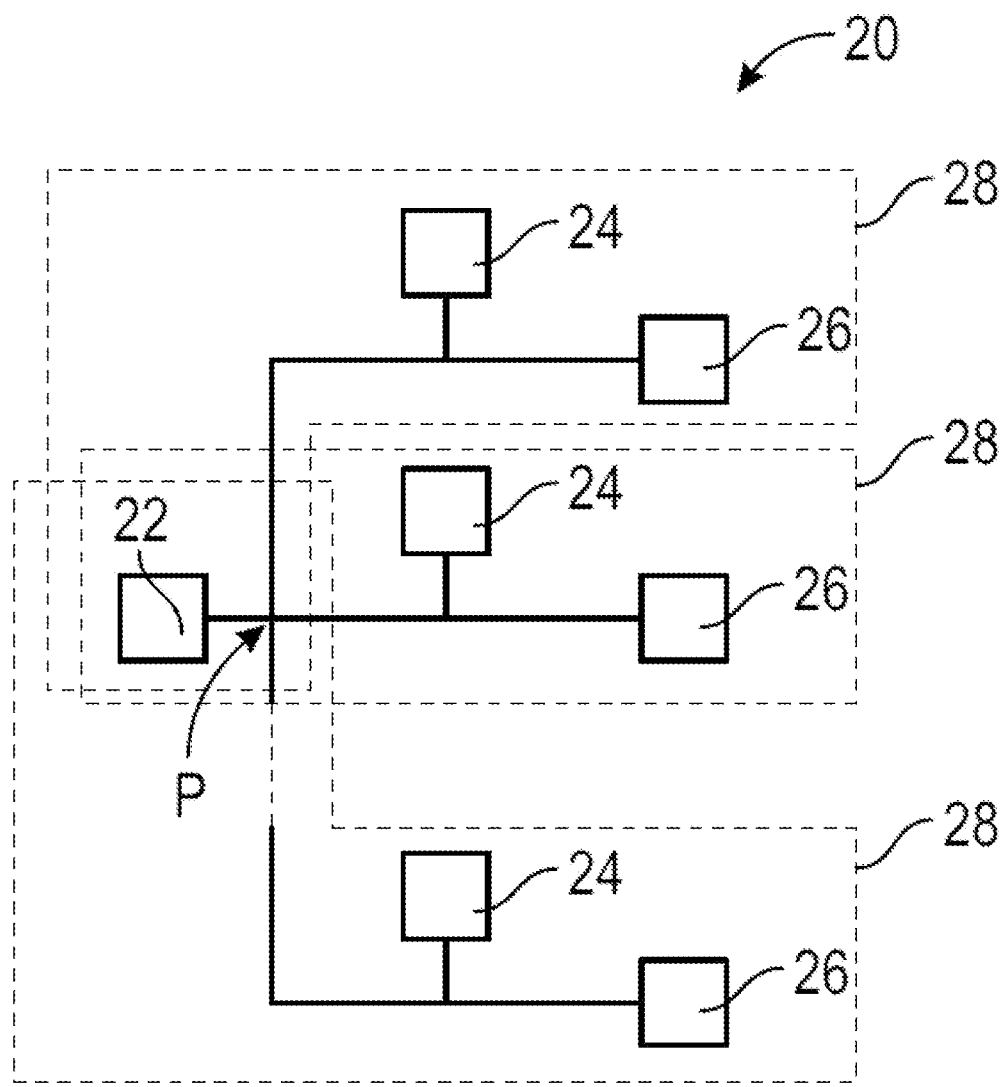
FIG. 2 represents a hybrid propulsion architecture according to a second embodiment of the prior art.
Figure 3:
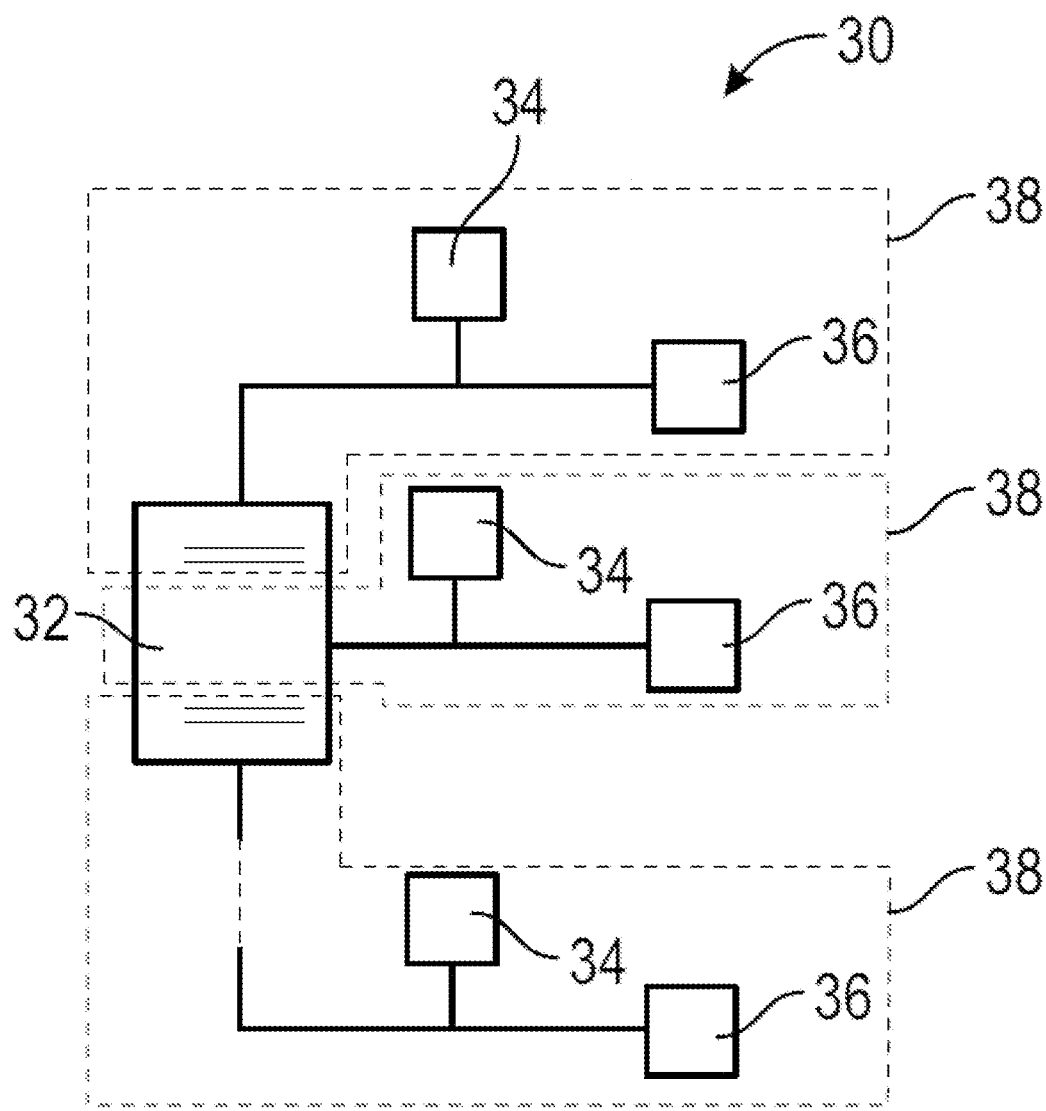
FIG. 3 shows a hybrid propulsion architecture according to a third embodiment of the prior art.

The elements having the same functions in the different implementations have the same references in the figures.

DESCRIPTION OF THE EMBODIMENTS

FIGS. 4 to 8 show a hybrid propulsion architecture 100 according to the invention, for a VTOL aircraft, such as a dual-rotor counter-rotating quadricopter.

The architecture 100 comprises a single first source 102 of a first type of energy. For example, as shown in FIGS. 5 to 8, the first source 102 comprises a gas turbine 110 and a variable frequency generator 112, followed by a passive rectifier 114. The rectifier 114 is an AC-DC converter.

The first source 102 may also be a battery, for example a lithium-ion battery. Thus, the first source 102 may be an electrical-thermal generation source, or an electrochemical storage source.

Figure 4:
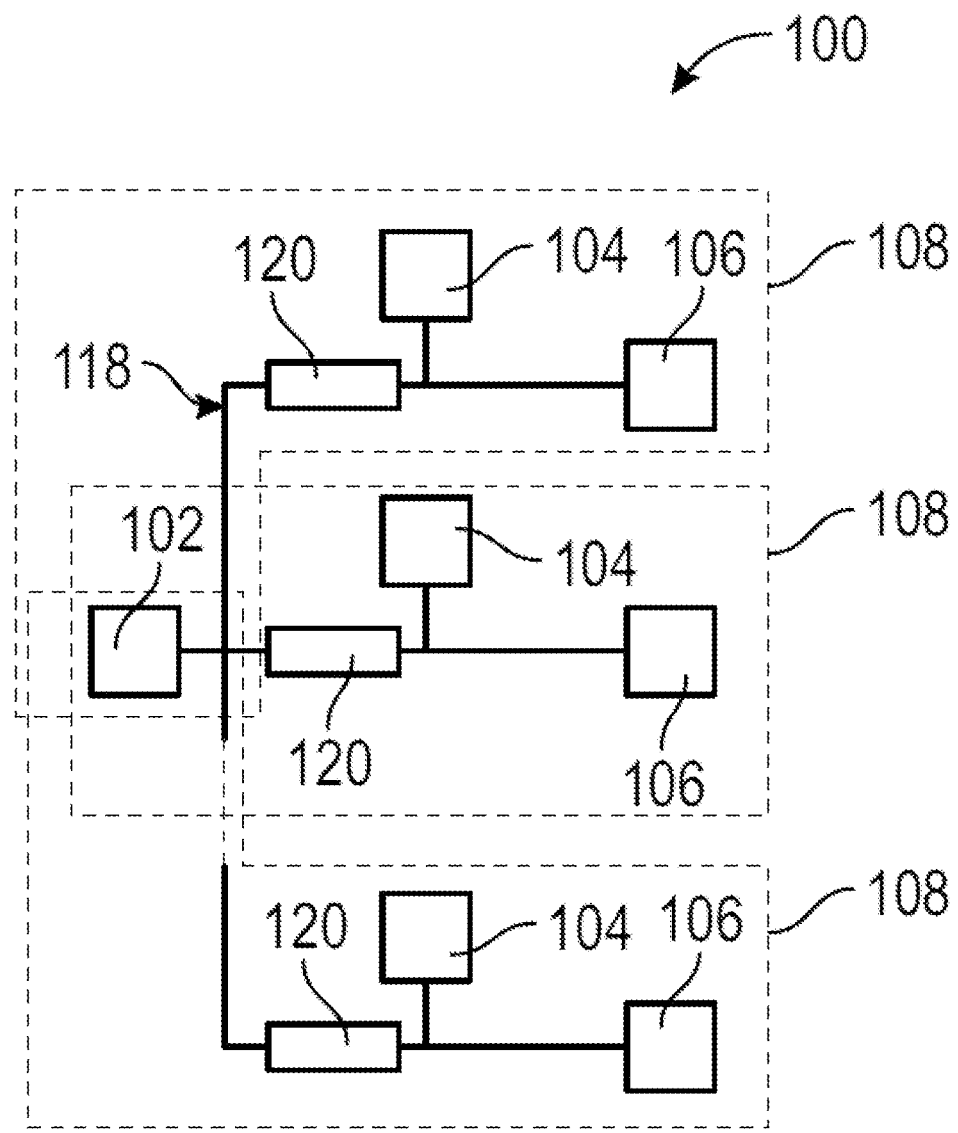
FIG. 4 shows a hybrid propulsion architecture according to the invention.
Figure 5:
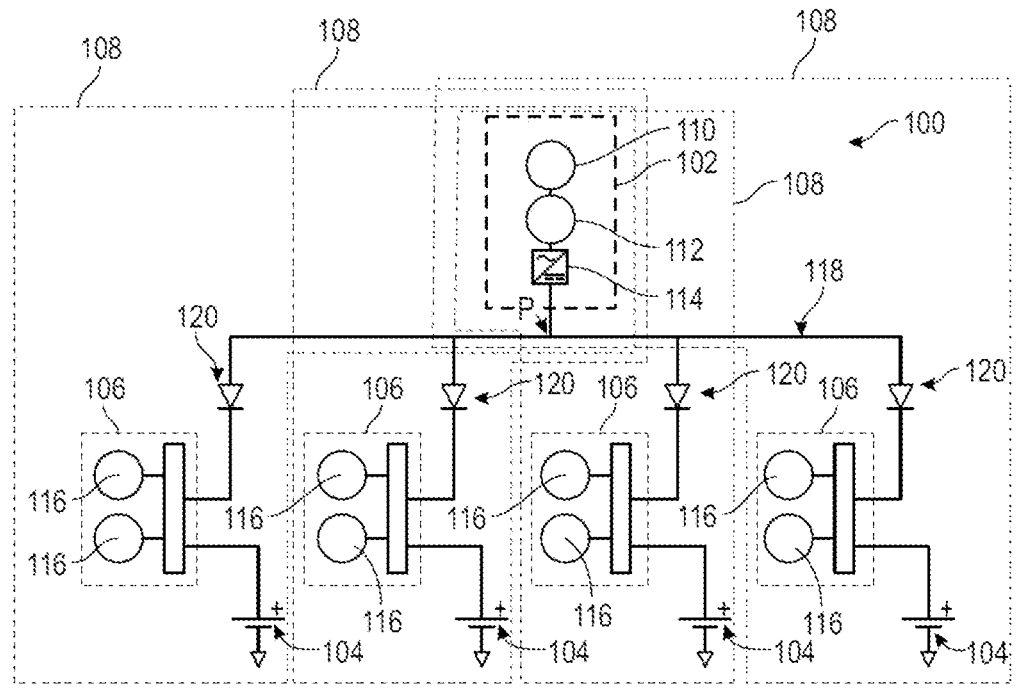
FIG. 5 represents the hybrid propulsion architecture of FIG. 4, according to a first embodiment of the invention.

The architecture 100 comprises second sources 104 of a second type of energy, which is different from the first type of energy of the first source 102. In FIG. 4, three second sources 104 are shown, and in FIGS. 5 to 8, four second sources 104 are shown.

For example, the second sources 104 may comprise permanent magnet generators. As shown in FIGS. 5 to 8, the second sources 104 may also be batteries. Thus, the second sources 104 may be electric-magnetic generation sources, or electrochemical storage sources.

Preferably, the first and second sources 102, 104 are segregated from each other. In other words, there is no communication between the different energy sources. For example, the first source 102 is segregated from each second source 104, and each second source 104 is segregated from the other second sources 104 and the first source 102.

The architecture 100 comprises electrical propulsion systems 106. In FIG. 4, three electrical propulsion systems 106 are shown, and in FIGS. 5 to 8, four electrical propulsion systems 106 are shown. The electrical propulsion system 106 may include a DC-AC converter (not shown), electric motors 116 connected to said DC-AC converter such that in operation the DC-AC converter supplies AC power to the electric motors 116, and propellers (not shown) coupled to the electric motors 116 such that in operation the electric motors 116 drive the propellers.

The architecture 100 comprises an electrical energy supply network 118 that connects the first source 102 and the second sources 104 to the electrical propulsion systems 106. The electrical energy supply network 118 may be an HVDC network.

In particular, each electrical propulsion system 106 is powered, via the electrical energy supply network 118, by the first source 102 and by one of the second sources 104.

The architecture 100 comprises propulsion channels 108. In FIG. 4, three propulsion channels 108 are shown, and in FIGS. 5 to 8, four propulsion channels 108 are shown. Each propulsion channel 108 comprises the first source 102, a second source 104, an electrical propulsion system 106, and a portion of the electrical energy supply network 118 that connects the first source, the second source 104 and the electrical propulsion system 106 together.

The architecture 100 also comprises means for segregating 120 the electrical propulsion systems 106. The segregation means 120 are arranged on the electrical energy supply network 118 and are configured to impose a direction of flow of electric power from the first source 102 to the electrical propulsion systems 106. The segregation means 120 ensure the segregation of the propulsion channels 108.

The segregation means 120 enable the flux of electrical energy to be unidirectional from the first source 102 to the electrical propulsion systems 106. The electrical energy is forced to flow from the common point P to the electrical propulsion systems 106, but cannot flow from the electrical propulsion systems 106 to the common point P. Each propulsion channel 108 comprises segregation means 120 between the first source 102 and the electrical propulsion system 106.

The segregation means 120 may comprise diodes, as shown in FIGS. 5 to 8.

The architecture 100 may comprise power electronic converters connected to the electrical energy supply network 118 to improve the control of electrical energy in the various propulsion channels 108.

Figure 6:
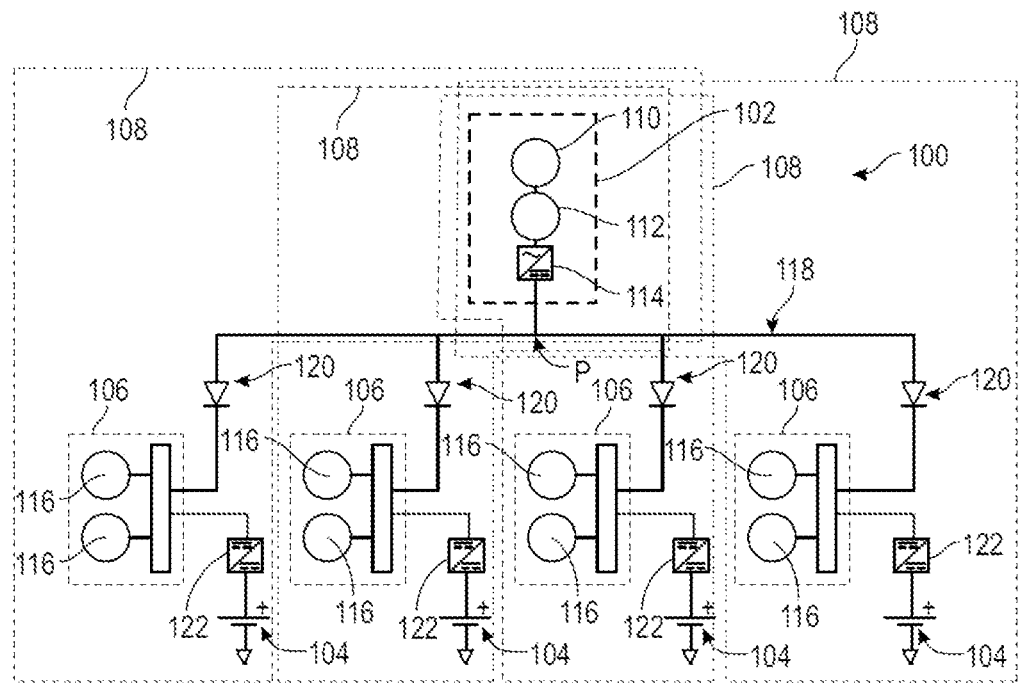
FIG. 6 shows the hybrid propulsion architecture of FIG. 4, according to a second embodiment of the invention.

According to an embodiment shown in FIG. 6, power electronic converters 122 may be connected between each second source 104 and each electrical propulsion system 106. The converters 122 may be DC-DC converters.

Figure 7:
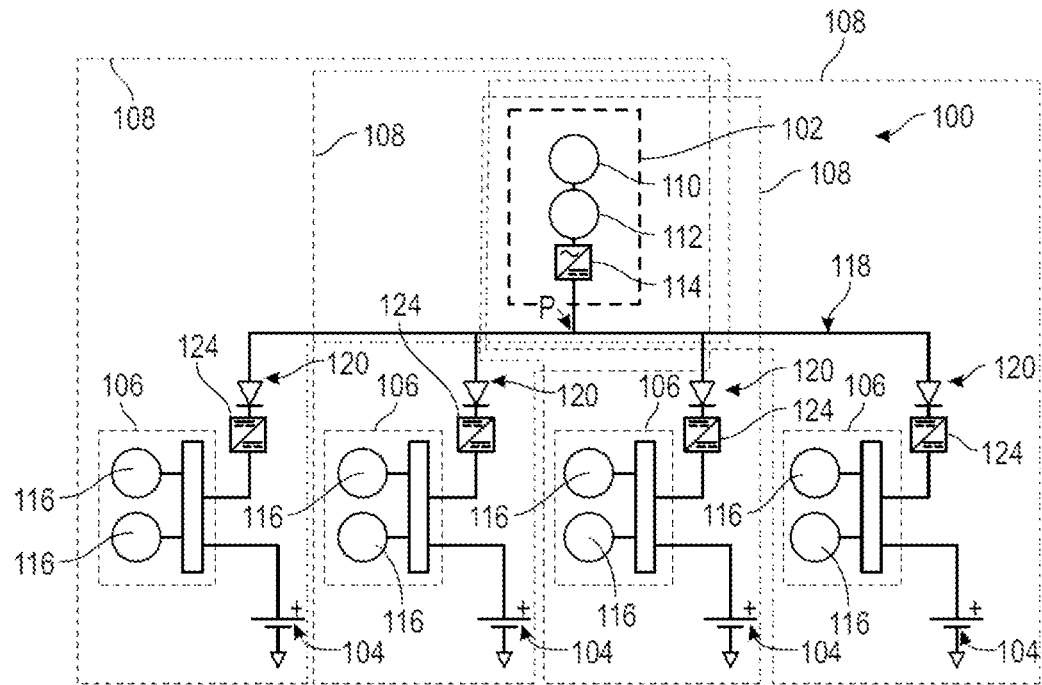
FIG. 7 shows the hybrid propulsion architecture of FIG. 4, according to a third embodiment of the invention.

According to an embodiment shown in FIG. 7, power electronic converters 124 may be connected on each propulsion channel 118 between the segregation means 120 and the electrical propulsion system 106. The converters 124 may be DC-DC converters.

Figure 8:
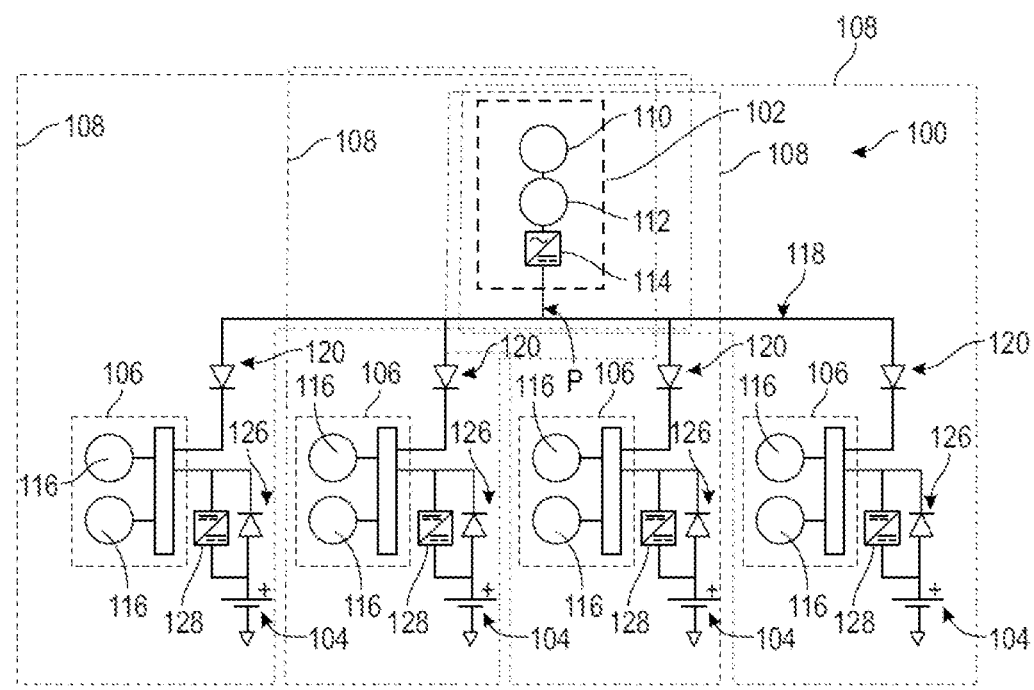
FIG. 8 shows the hybrid propulsion architecture of FIG. 4, according to a fourth embodiment of the invention.

According to an embodiment shown in FIG. 8, the architecture 100 may comprise second segregation means 126 of the electrical propulsion systems 106. The segregation means 126 are arranged on the electrical energy supply network 118 and are configured to impose a direction of flow of electric power from the second sources 104 to the electrical propulsion systems 106. The segregation means 126 enable the flux of electrical energy to be unidirectional from the second source 104 to the electrical propulsion systems 106. Power electronic converters 128 may be connected on each propulsion channel 118 between the second source 104 and the electrical propulsion system 106, in parallel to the segregation means 126. The converters 128 may be DC-DC converters.

The hybrid propulsion architecture according to the invention has been mainly described for a dual-rotor counter-rotating quadricopter VTOL, but can of course be integrated in any kind of aircraft.

The invention claimed is:

1. A hybrid propulsion architecture for an aircraft, comprising:
    a first source, of a first type, of electrical energy,
    a plurality of second sources, of a second type, of electrical energy, said second type being different from said first type,
    a plurality of electrical propulsion systems,
    an electrical energy supply network connecting said first source and said second sources to said electrical propulsion systems such that each electrical propulsion system is powered by said first source and by one of said second sources,
    propulsion channels, each propulsion channel comprising said first source, one of said second sources, one of said electrical propulsion systems, and a portion of the electrical energy supply network,
    said architecture being characterized in that it further comprises:
        means for segregating said electrical propulsion systems, said segregation means being arranged on the electrical energy supply network and configured to impose a direction of flow of electric power from said first source to said electrical propulsion systems so that said propulsion channels are segregated,
        wherein the electrical energy supply is a High Voltage Direct Current network, and
        wherein said segregation means comprise diodes.

2. The hybrid propulsion architecture according to claim 1, wherein said first source is a battery and said second sources are permanent magnet generators.

3. The hybrid propulsion architecture according to claim 1, wherein said first and second sources are segregated from each other.

4. The hybrid propulsion architecture according to claim 3, wherein said first source is a variable frequency generator, and said architecture further comprises a passive rectifier connected to said first source.

5. The hybrid propulsion architecture according to claim 1, comprising power electronic converters connected to the electrical energy supply network.

6. The hybrid propulsion architecture according to claim 5, wherein the power electronic converters are connected between said second sources and said electrical propulsion systems.

7. The hybrid propulsion architecture according to claim 5, wherein the power electronic converters are connected between said segregation means and said electrical propulsion systems.

8. The hybrid propulsion architecture according to claim 5, comprising second means for segregating said electrical propulsion systems arranged on the electrical energy supply network and configured to impose a direction of flow of electric power from said second sources to said electrical propulsion systems and wherein the power electronic converters are connected between said second sources and said electrical propulsion systems, in parallel to said second segregation means.

9. A multi-rotor aircraft, in particular with vertical take-off and landing, wherein it comprises a hybrid propulsion architecture according to claim 1.

10. A hybrid propulsion architecture for an aircraft, comprising:
 a first source, of a first type, of electrical energy,
 a plurality of second sources, of a second type, of electrical energy, said second type being different from said first type,
 a plurality of electrical propulsion systems,
 an electrical energy supply network connecting said first source and said second sources to said electrical propulsion systems such that each electrical propulsion system is powered by said first source and by one of said second sources,
 propulsion channels, each propulsion channel comprising said first source, one of said second sources, one of said electrical propulsion systems, and a portion of the electrical energy supply network,
 said architecture being characterized in that it presents a common point through which electrical energy can flow from the first source to the electrical propulsion systems and it further comprises:
  means for segregating said electrical propulsion systems, said segregation means being arranged on the electrical energy supply network and configured to impose a direction of flow of electric power from said first source to said electrical propulsion systems so that the electrical energy is forced to transit from the common point towards the electrical propulsion systems, but cannot transit from the electrical propulsion systems to the common point and so that said propulsion channels are segregated,
 wherein the electrical energy supply is a High Voltage Direct Current network, and
 wherein said segregation means comprise diodes.

* * * * *